United States Patent [19]

Totani

[54] APPARATUS FOR HEAT SEALING TWO SUPERPOSED LAYERS OF PLASTIC FILM

[75] Inventor: Mikio Totani, Muko, Japan

[73] Assignee: Totani Giken Kogyo Co., Ltd., Kyoto, Japan

[21] Appl. No.: 236,687

[22] Filed: May 2, 1994

Related U.S. Application Data

[63] Continuation of Ser. No. 958,430, Oct. 8, 1992, abandoned.

[30] Foreign Application Priority Data

Oct. 9, 1991 [JP] Japan ................................. 3-292080

[51] Int. Cl.$^6$ ................................................. B32B 31/00
[52] U.S. Cl. ........................... 156/359; 493/8; 493/10; 53/51; 53/64; 53/75
[58] Field of Search ..................... 156/359; 493/8, 493/10; 53/51, 64, 75

[56] References Cited

U.S. PATENT DOCUMENTS

| | | | |
|---|---|---|---|
| 2,374,779 | 5/1945 | Preston | 493/8 |
| 2,676,444 | 4/1954 | Gaubert | 156/359 |
| 3,397,633 | 8/1968 | Harris | 156/359 |
| 3,494,816 | 2/1970 | Fener | 156/359 |
| 4,229,244 | 10/1980 | Swope | 156/358 |
| 4,378,266 | 3/1983 | Gerken | 156/359 |
| 4,391,079 | 7/1983 | Cherney | 53/51 |

FOREIGN PATENT DOCUMENTS 3-197119  8/1991  Japan .

[11] Patent Number: 5,540,802
[45] Date of Patent: Jul. 30, 1996

*Primary Examiner*—Chester T. Barry
*Attorney, Agent, or Firm*—Morgan & Finnegan, L.L.P.

[57] ABSTRACT

An apparatus for heat sealing two superposed layers of plastic film, in which movable sealing bar means are disposed opposite to fixed sealing bar means so that the layers of the plastic film are intermittently passed between the movable and fixed sealing bar means. The movable sealing bar means is reciprocatingly moved whenever the plastic film layers are intermittently fed. The layers of plastic film are sandwiched between and heat sealed by the movable and fixed sealing bar means when temporarily stopped. The feeding speed for the layers of plastic film, the feeding time for the layers of plastic film, the driving speeds of the movable sealing bar drive means and the heat sealing time for the layers of plastic film are computer controlled. The computer is programmed so that a waiting time can be inserted between the plastic film feeding time and the plastic film heat sealing time. Accordingly, the plastic bag making speed can be optionally lowered without changing the length of the plastic bag and heat sealing condition.

3 Claims, 3 Drawing Sheets

APPARATUS FOR HEAT SEALING TWO SUPERPOSED LAYERS OF PLASTIC FILM

This is a continuation of application Ser. No. 07/958,430, filed on Oct. 8, 1992, now abandoned.

BACKGROUND OF THE INVENTION

1. Field of the Invention

The invention relates to an apparatus for heating sealing two superposed layers of plastic film.

2. Description of the Prior Art

In a plastic bag making machine, an apparatus has been generally used for heating sealing two superposed layers of plastic film, as disclosed in Japanese Laid-Open Patent Publication No. 197,119 of 1991. The apparatus includes a plurality of fixed sealing bars and a plurality of movable sealing bars disposed opposite to the fixed sealing bars respectively. The plastic film is folded in two superposed layers, the layers of plastic film being passed between the movable and fixed sealing bars. Feed rollers are engaged with the layers of plastic film and rotated by a servo motor so that the layers of plastic film are intermittently fed for a length and temporarily stopped whenever intermittently fed. A rocker is operatively connected to the movable sealing bars. A crank is operatively connected to the rocker and rotated by a servo motor. The rocker is rocked by the crank so that the movable sealing bars are reciprocatingly moved by the rocker, between first and second positions. In the first position, the movable sealing bars are advanced toward the fixed sealing bars so that the layers of plastic film are sandwiched between the movable and fixed sealing bars. In the second position, the movable sealing bars are retracted and spaced from the fixed sealing bars and the layers of plastic film. The layers of plastic film are sandwiched between and heat sealed by the movable and fixed sealing bars when temporarily stopped.

In the apparatus disclosed in the above Japanese Laid-Open Patent Publication, the feeding time and the heat sealing time for the layers of plastic film are continuous with each other so that the layers of plastic film are sandwiched between and heat sealed by the movable and fixed sealing bars, as soon as temporarily stopped. The layers of plastic film are then fed again as soon as the movable sealing bars are retracted from the layers of plastic film. The cycle time of the apparatus is therefore determined by the plastic film feeding and heat sealing times, plastic bags are being made at every cycle time. Accordingly, the apparatus has a problem that when the plastic film feeding and heat sealing times are once selected, the making speed of plastic bag can not be optionally changed. This is inconvenient. For example, when the layers of plastic film are experimentally fed and heat sealed for adjusting the apparatus after the selection of the plastic film feeding and heat sealing times, the plastic film feeding and heat sealing times are required to maintain at selected values. In contrast, the plastic bag making speed is not required to maintain at selected value. It is desired from the viewpoint of plastic film material cost to lower the plastic bag making speed. However, when the plastic film feeding and heat sealing times are once selected, the cycle time of the aparatus and the plastic bag making speed are determined by the selected values so that the plastic bag can not be lowered.

OBJECT OF THE INVENTION

It is therefore an object of the invention to provide a new and improved apparatus for heat sealing two superposed layers of plastic film, which overcomes the problem described above.

The other object of the invention is to maintain the plastic film feeding and heat sealing times at selected values and optionally change the cycle time of the apparatus.

SUMMARY OF THE INVENTION

Accordingly to the invention, an apparatus is provided for heat sealing two superposed layers of plastic film, in which movable sealing bar means is disposed opposite to fixed sealing bar means, the layers of plastic film being passed between the movable and fixed sealing bar means. The plastic film layers are intermittently fed for a length and temporarily stopped whenever intermittently fed. The movable sealing bar means is reciprocatingly moved whenever the plastic film layers are intermittently fed, between a first position in which the movable sealing bar means is advanced toward the fixed sealing bar means so that the layers of plastic film are sandwiched between the movable and fixed sealing bar means, and a second position in which the movable sealing bar means is retracted and spaced from the fixed sealing bar means and the layers of plastic film. The layers of plastic film are sandwiched between and heat sealed by the movable and fixed sealing bar means when temporarily stopped.

The apparatus comprises a computer connected to the plastic film intermittently feeding means and the movable sealing bar drive means, the plastic film intermittently feeding means and the movable sealing bar drive means being controlled by the computer in accordance with a predetermined program. The feeding speed V0 for the layers of plastic film, the feeding time T1 for the layers of plastic film, the driving speeds V1 and V2 of the movable sealing bar drive means and the heat sealing time T2 for the layers of plastic film are selected by the computer. In addition, the computer is constructed so that a waiting time T4 can be inserted between the plastic film feeding time T1 and the plastic film heat sealing time T2 to thereby change the cycle time T3 of the apparatus.

In a preferred embodiment, the movable sealing bar drive means comprises rocker means operatively connected to the movable sealing bar means, crank means operatively connected to the rocker means and a first servo motor operatively connected to the crank means, the computer being connected to the first servo motor. The rocker means is rocked by the crank means which is rotated by the servo motor so that the movable sealing bar means is reciprocatingly moved by the rocker means. The driving speeds of the movable sealing bar drive means comprises the rotating speeds V1 and V2 of the crank means, which are selected by the computer.

The rotating speed of the crank means is maintained at a first speed V1 when the layers of plastic film are sandwiched between the movable and fixed sealing bar means, the plastic film heat sealing time T2 being determined by the first speed V1. The rotating speed of the crank means is changed toward a second speed V2 when the layers of plastic film are not sandwiched between the movable and fixed sealing bar means, the waiting time T4 being determined by the second speed V2.

The plastic film intermittently feeding means comprises feed roller means engaged with the layers of plastic film and a second servo motor operatively connected to the feed roller means, the computer being connected to the second servo motor. The layers of plastic film are fed by the feed roller means which is rotated by the second servo motor.

The rotating angle of the crank means is simulated by the computer.

BRIEF DESCRIPTION OF THE DRAWING

The accompanying drawings illustrate principals and preferred embodiment of the invention, and together with the description serve to explain the principals of the invention, in which.

DETAILED DESCRIPTION OF THE PREFERRED EMBODIMENT

Figure 1:
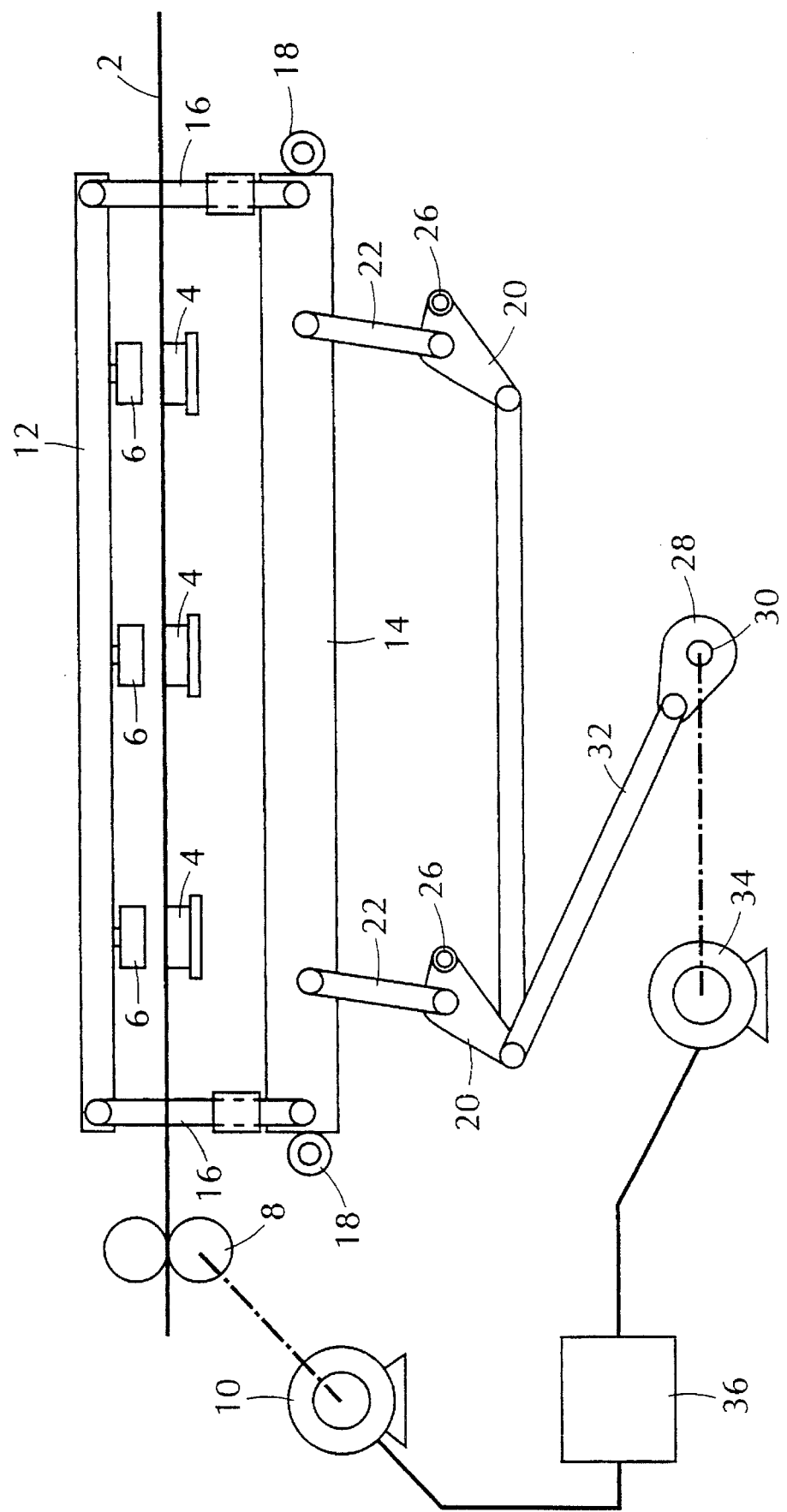
FIG. 1 is a schematic side view of an apparatus for heat sealing two superposed layers of plastic film according to the invention.

Referring to FIG. 1, there is illustrated an apparatus for heat sealing two superposed layers of plastic film 2 in a plastic bag making machine, according to the invention. The apparatus includes three fixed sealing bars 4 spaced from each other in a direction in which the layers of plastic film 2 are fed. Three movable sealing bars 6 are provided above the fixed sealing bars 4 and disposed opposite to the fixed sealing bars 4. The plastic film is folded in two superimposed layers, the layers of plastic film 2 being passed between the movable sealing bars 6 and the fixed sealing bars 4 and fed by plastic film intermittently feeding means. The plastic film intermittently feeding means comprises a pair of feed rollers 8. The layers of plastic film 2 are sandwiched between the feed rollers 8 so that the feed rollers 8 are engaged with the layers of plastic film 2. A servo motor 10 is operatively connected to the feed roller 8 which is rotated by the servo motor 10 so that the layers of plastic film 2 are intermittently fed for a length, as described below.

The movable sealing bars 6 are mounted on and supported by a pair of upper frames 12 which are disposed on the opposite sides of the layers of the plastic film 2. The upper frames 12 are fixedly connected to a pair of lower frames 14 by two pairs of rods 16. The lower frames 14 are disposed on the opposite sides of the layers of plastic film 2, guide rollers 18 being engaged with the lower frames 14 so that the upper and lower frames 12 and 14 and the rods 16 are guided by the guide rollers 18 for movement in a vertical direction. Movable sealing bar drive means comprises two pairs of rockers 20 disposed on the opposite sides and operatively connected to the lower frames 14 by two pairs of links 22 respectively, the rockers 20 disposed on one side being operatively connected to each other by a link 24. A pair of shafts 26 extend between the rockers 20 disposed the opposite sides, the rockers 20 being fixedly mounted on the shafts 26 and connected to each other by the shafts 26. The shafts 26 are guided by guide means not shown for rotation so that the rockers 20 can be rocked integrally with the shaft 26 whereabout. A crank 28 is mounted on a shaft 30 for rotation thereabout and operatively connected to one of the rockers 20 by a link 32, a servo motor 34 being operatively connected to the crank 28. The rockers 20 are therefore rocked by the crank 28 which is rotated by the servo motor 34 so that the upper and lower frames 12 and 14, the rods 16 and the movable sealing bars 6 are reciprocatingly moved in the vertical direction by the rockers 20. The movable sealing bars 6 are reciprocatingly moved between a first position in which the movable sealing bars 6 are advanced toward the fixed sealing bars 4 so that the the layers of plastic film 2 are sandwiched between the movable and fixed sealing bars 6 and 4, and a second position in which the movable sealing bars 6 are retracted and spaced from the fixed sealing bars 4 and the layers of plastic film 2.

A computer 36 is connected to the servo motors 10 and 34 so that the servo motors 10 and 34 are controlled by the computer 36 in accordance with a predetermined program, as described below.

In general, the controlling characteristics of the apparatus shown in FIG. 1 involves the following. The servo motor 10 is controlled by the computer 36 in the predetermined program so that the layers of plastic film 2 are fed by the feed rollers 8 which are rotated by the servo motor. 10. The feeding speed V0 for the layers of plastic film 2 and the feeding time T1 for the layers of plastic film 2 are selected by the computer 36, so that the layers of plastic film 2 are intermittently fed at the selected feeding speed V0 and in each feeding time T1 and temporarily stopped whenever intermittently fed. The servo motor 34 is simultaneously controlled by the computer 36 in accordance with the predetermined program so that the crank 28 is rotated by the servo motor 34. The rotating speeds V1 and V2 of the crank 28 and the heat sealing time T2 for the layers of plastic film 2 are selected by the computer 36 so that the crank 28 is rotated at the selected rotating speeds V1 and V2. Accordingly, the movable sealing bars 6 are lowered toward the first position P1 thereof and advanced toward the fixed sealing bars 4, the layers of plastic film 2 being sandwiched between and heat sealed by the movable and fixed sealing bars 6 and 4 when temporarily stopped. The layers of plastic film 2 are heat sealed within the selected heat sealing time T2. The movable sealing bars 6 are then raised to the second position P2 thereof, and retracted and spaced from the fixed sealing bars 4 and the layers of the plastic film 2.

The length of the layers of plastic film 2 fed at every cycle time T3 is determined by the plastic film feeding speed V0 and feeding time T1, the layers of plastic film 2 being intermittently fed for the length so that the plastic gab has a length corresponding thereto. The plastic film feeding speed V0 and feeding time T1 can be changed by the computer 36 so that the length of the plastic bag can be optionally selected.

As to the crank 28 and the movable sealing bars 6, a first speed V1 of the crank 28 is selected by the computer 36 so that the rotating speed of the crank 28 is maintained at the first speed V1 when the layers of the plastic film 2 are sandwiched between the movable and fixed sealing bars 6 and 4. The plastic film heat sealing time T2 is determined by the first speed V1. The first speed V1 of the crank 28 can be changed by the computer 36 to adjust the plastic film heat sealing time T2 in accordance with the thickness and material of the layers of plastic film 2 so that the layers of the plastic film 2 is conveniently heat sealed. The rotating speed of the crank 28 is changed and raised toward a second speed V2 when the layers of plastic film 2 are not sandwiched between the movable and fixed sealing bars 6 and 4.

Figure 2:
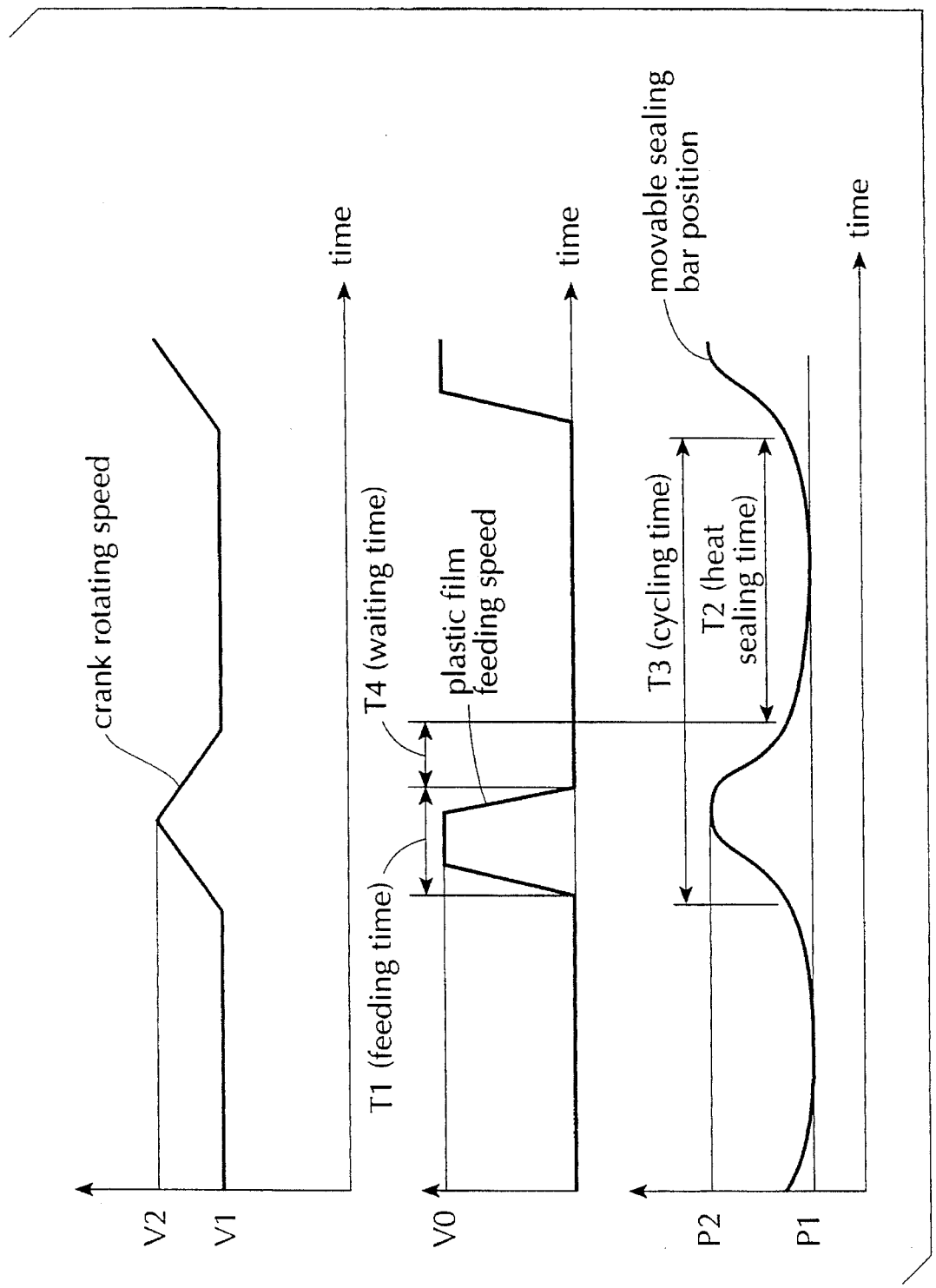
FIG. 2 is a graphic view showing another controlling characteristic of the apparatus of FIG. 1.
Figure 3:
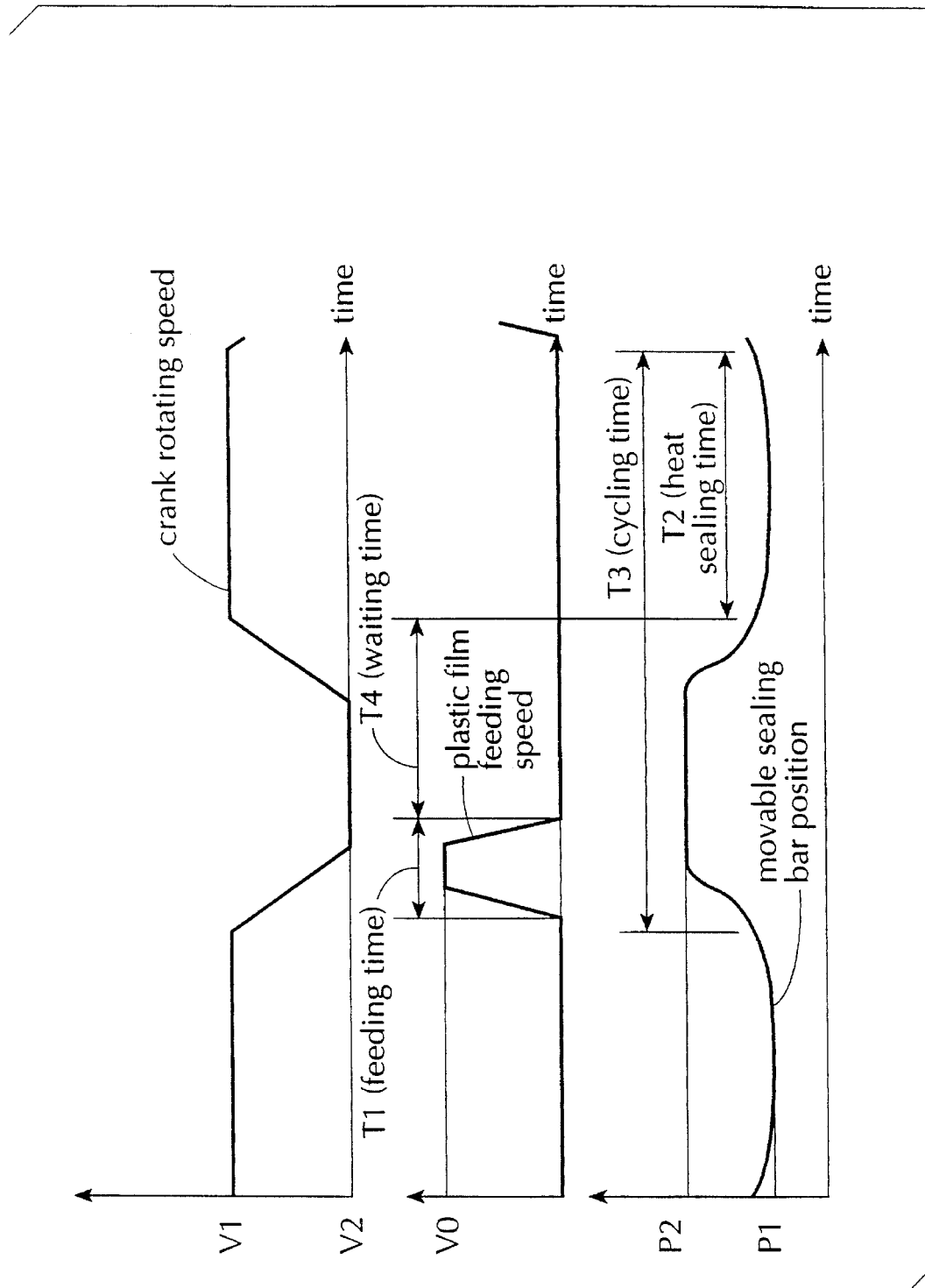
FIG. 3 is a graphic view showing the other controlling characteristic of the apparatus of FIG. 1.

In the present invention, a waiting time T4 can be inserted between the plastic feeding and heat sealing times T1 and T2 to thereby change the cycle time T3 of the apparatus, as shown in FIG. 2 and FIG. 3. Accordingly, for example, when the layers of plastic film 2 are experimentally fed and heat sealed for adjusting the apparatus after the selection of the plastic film feeding and heat sealing times T1 and T2, the cycle time T3 can be optionally changed and lengthened while the plastic film feeding and heat sealing times T1 and T2 are maintained at selected values. Accordingly, the plastic bag making speed can be optionally lowered without changing the length of the plastic bag and heat sealing condition, to thereby minimize the plastic film material cost. The waiting time T4 can be then eliminated when the apparatus is operated to make plastic bags, to shorten the cycle time T3 of the apparatus and raise the plastic bag making speed.

In order to insert the waiting time T4 between the plastic feeding and heat sealing T1 and T2, the second speed V2 of the crank 28 is adjusted and changed by the computer 36. In the controlling characteristic shown in FIG. 2, the second speed V2 is decreased to insert the waiting time T4. In the controlling characteristic shown, in FIG. 3, the second speed V2 is adjusted to a lower value than the first speed V1 so that the waiting time T4 is longer than the waiting time T4 in FIG. 2.

When the movable sealing bars 6 are stopped while the layers of plastic film 2 are fed by the feed rollers 8 for adjusting the apparatus, the rotating angle of the crank 28 can be simulated by the computer 36 while the feed rollers 8 are rotated and crank 28 is stopped. Accordingly, in operating the apparatus and reciprocating moving the movable sealing bars 6, the servo motor 34 can be drived by the computer 36 to rotate the crank 28 when the simulated angle reaches a certain angle in the computer 36 so that the feeding phase of the layers of plastic film 2 corresponds to the reciprocatingly moving phase of the movable sealing bars 6.

What is claimed is:

1. An apparatus for heat sealing two superposed layers of plastic film, including fixed sealing bar means, movable sealing bar means disposed opposite to said fixed sealing bar means, the layers of plastic film being passed between said movable and fixed sealing bars, plastic film intermittently feeding means including a second servo motor operatively connected to feed roller means which is rotated by said second servo motor for intermittently feeding the layers of plastic film for a length, the layers of plastic film being temporarily stopped whenever intermittently fed, and movable sealing bar drive means including a first servo motor operatively connected to crank means which is rotated by said first servo motor for reciprocatingly moving said movable sealing bar means whenever the layers of plastic film are intermittently fed, between a first position in which said movable sealing bar means is advanced toward said fixed sealing bar means so that the layers of plastic film are sandwiched between said movable and fixed sealing bar means, and a second position in which said movable sealing bar means is retracted and spaced from said fixed sealing bar means and the layers of plastic film, the layers of plastic film being sandwiched between and heat sealed by said movable and fixed sealing bar means when temporarily stopped, said apparatus comprising a computer connected to said first and second servo motors, said computer being programmed to control operation of said first and second servo motors so that the layers of plastic film are intermittently fed at a feeding speed V0 for a feeding time T1 and said crank means is rotated and maintained at a first speed V1 to heat seal said layers of plastic film for a heat sealing time T2 and then temporarily accelerated or decelerated to a second speed V2, said computer being further programmed so that a waiting time T4 can be inserted between said plastic film feeding time T1 and said plastic film heat sealing time T2 to thereby change the cycle time T3 of the apparatus, said feeding speed V0 and said feeding time T1 being automatically determined by said computer in accordance with the parameters which are selected by an operator and input to said computer, said parameters including the feed length of the layers and the acceleration rate from 0 to said feeding speed V0, said first speed V1 being automatically determined by said computer in accordance with said sealing time T2 which is selected by the operator and input to said computer, said second speed V2 being automatically determined by said computer in accordance with the sum of said feeding time T1 and said waiting time T4, said waiting time T4 being selected by the operator and input to said computer.

2. An apparatus as set forth in claim 1, wherein said movable sealing bar drive means comprises rocker means operatively connected to said movable sealing bar means, said crank means being operatively connected to said rocker means, said rocker means being rocked by said crank means which is rotated by said servo motor so that said movable sealing bar means is reciprocatingly moved by said rocker means.

3. An apparatus as set forth in claim 2, wherein the rotating angle of said crank means is simulated by said computer.

* * * * *